(12) United States Patent
Daniel

(10) Patent No.: US 10,542,502 B2
(45) Date of Patent: *Jan. 21, 2020

(54) SELECTIVE MULTICHANNEL AMPLIFICATION IN A DISTRIBUTED ANTENNA SYSTEM (DAS)

(71) Applicant: Corning Optical Communications LLC, Charlotte, NC (US)

(72) Inventor: Moshe Daniel, Gedera (IL)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,403

(22) Filed: Mar. 18, 2019

(65) Prior Publication Data

US 2019/0215785 A1     Jul. 11, 2019

Related U.S. Application Data

(63) Continuation of application No. 15/920,805, filed on Mar. 14, 2018, now Pat. No. 10,278,138, which is a continuation of application No. PCT/IL2016/051144, filed on Oct. 25, 2016.

(60) Provisional application No. 62/243,867, filed on Oct. 20, 2015.

(51) Int. Cl.
| | |
|---|---|
| *H04W 52/34* | (2009.01) |
| *H04B 7/0426* | (2017.01) |
| *H04W 40/08* | (2009.01) |
| *H04W 52/52* | (2009.01) |
| *H04W 88/08* | (2009.01) |

(52) U.S. Cl.
CPC ........ *H04W 52/346* (2013.01); *H04B 7/0426* (2013.01); *H04B 7/0447* (2013.01); *H04W 40/08* (2013.01); *H04W 52/52* (2013.01); *H04W 88/085* (2013.01)

(58) Field of Classification Search
CPC .......................... H04W 52/346; H04B 7/0426
See application file for complete search history.

(56) References Cited

U.S. PATENT DOCUMENTS

| | | |
|---|---|---|
| 8,848,766 B2 | 9/2014 | Lemson et al. |
| 8,948,155 B2 | 2/2015 | Cannon et al. |
| 2005/0134305 A1 | 6/2005 | Stojanovic et al. |

(Continued)

*Primary Examiner* — Tuan H Nguyen
(74) *Attorney, Agent, or Firm* — C. Keith Montgomery

(57) ABSTRACT

Embodiments of the disclosure relate to selective multichannel amplification in a distributed communication system. In this regard, a remote antenna unit (RAU) in the distributed communication system receives downlink digital signals associated with downlink channels having respective downlink channel bandwidths. The RAU digitally scales the downlink digital signals based on respective digital scaling factors to generate scaled downlink digital signals having a substantially equal channel power density in the downlink channels. By digitally scaling the downlink digital signals to provide the substantially equal channel power density in the downlink channels, it is possible to provide substantially uniform radio frequency (RF) coverage range across the downlink channels, thus helping to improve overall RF coverage and user experience in a coverage area of the distributed communication system.

19 Claims, 11 Drawing Sheets

(56) References Cited

U.S. PATENT DOCUMENTS

2008/0273634 A1* 11/2008 Patel .................... H04L 5/0007
375/343
2010/0273520 A1     10/2010 Pelletier et al.
2011/0306380 A1* 12/2011 Zavadsky ............ H04B 7/0842
455/522

* cited by examiner

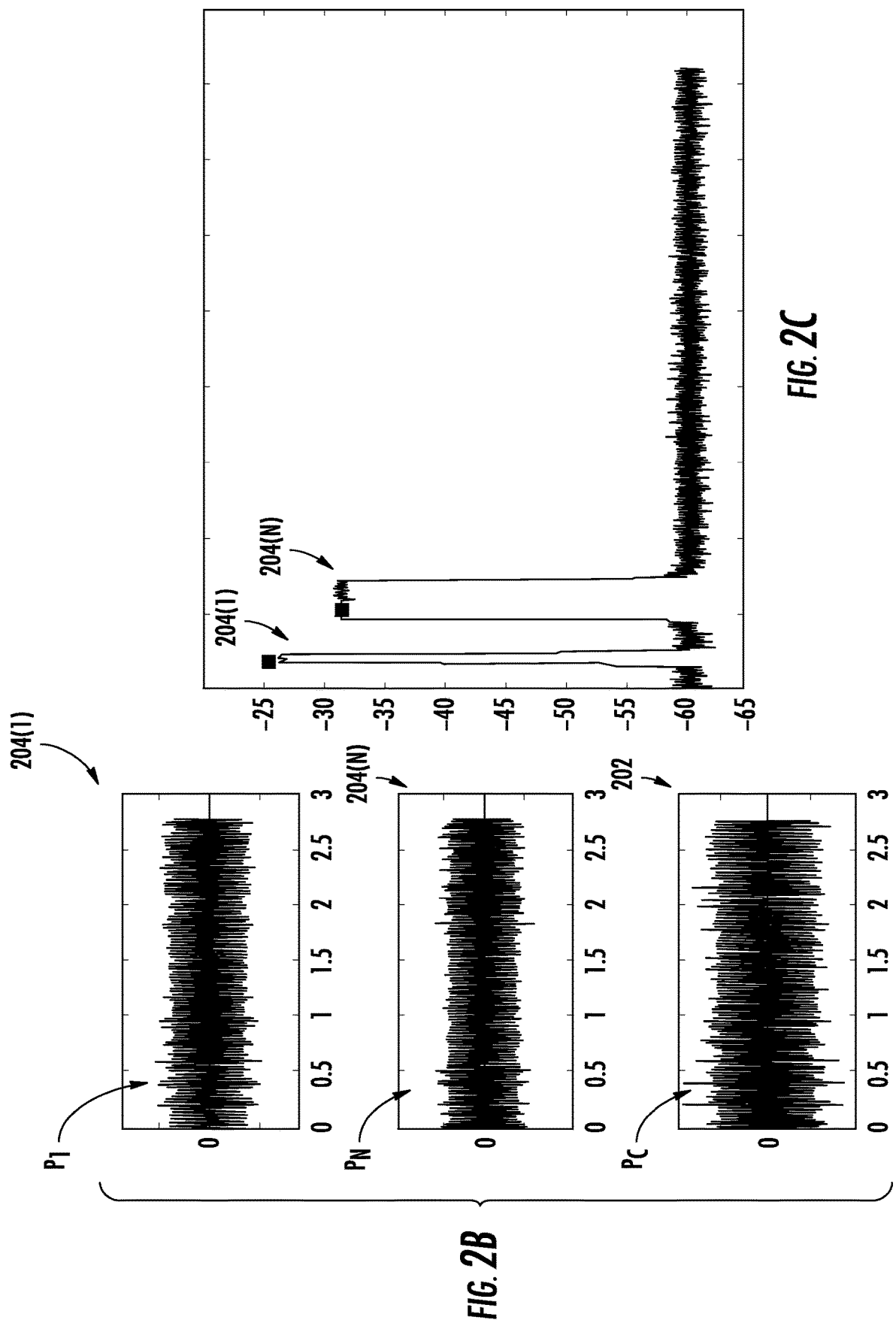

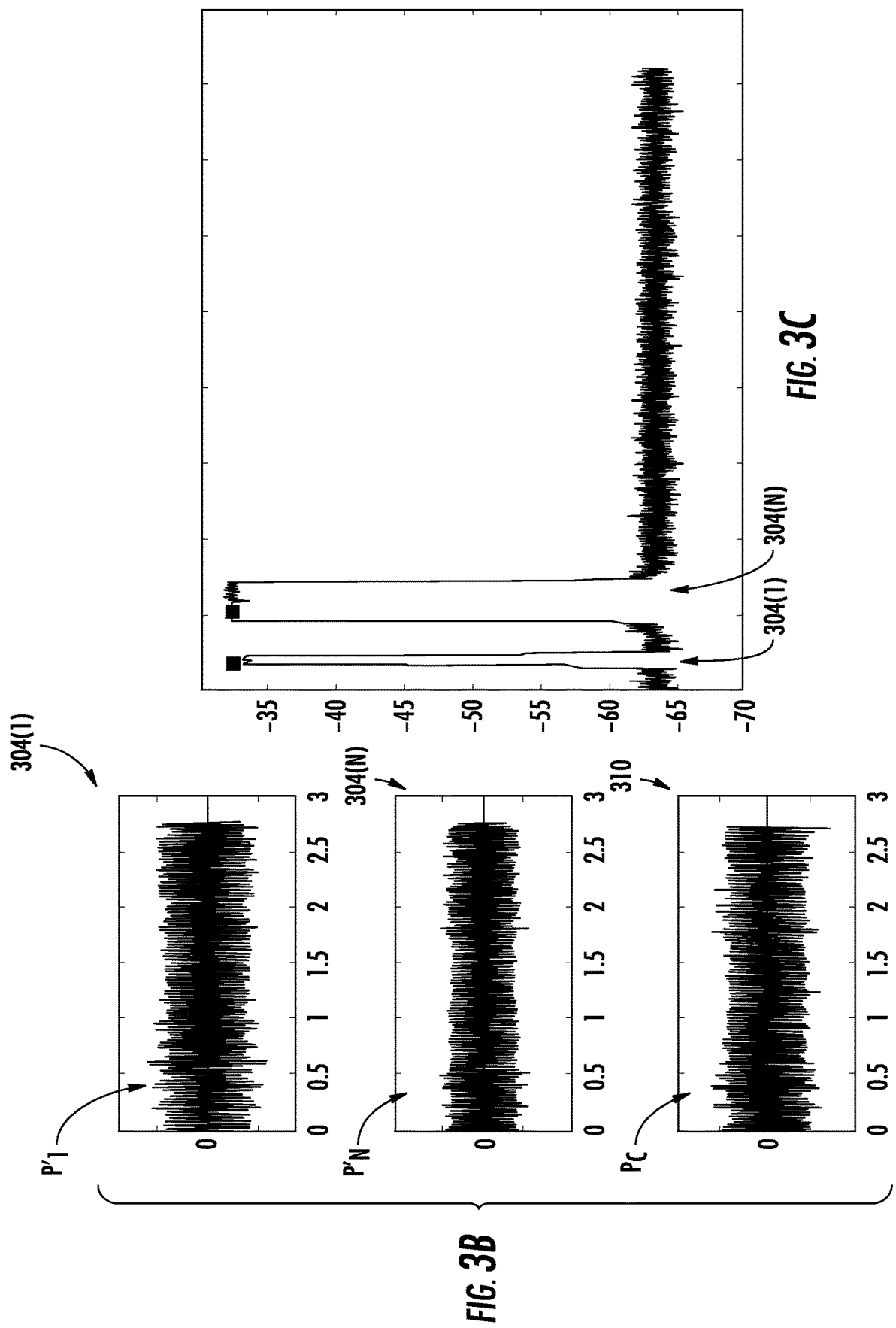

SELECTIVE MULTICHANNEL AMPLIFICATION IN A DISTRIBUTED ANTENNA SYSTEM (DAS)

CROSS-REFERENCE TO RELATED APPLICATIONS

This is a continuation of U.S. application Ser. No. 15/920,805, filed Mar. 14, 2018, which is a continuation of International Application No. PCT/IL2016/051144, filed Oct. 25, 2016, which claims the benefit of priority under 35 U.S.C. § 119 of U.S. Provisional Application No. 62/243,867, filed on Oct. 20, 2015, the contents of which are relied upon and incorporated herein by reference in their own entireties.

BACKGROUND

The disclosure relates generally to a distributed antenna system (DAS) and more particularly to techniques for amplifying multiple wireless channels in a DAS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communications devices may not otherwise be able to effectively receive radio frequency (RF) signals from a signal source.

In this regard, FIG. 1 illustrates distribution of communication services to remote coverage areas 100(1)-100(N) of a DAS 102, wherein 'N' is the number of remote coverage areas. These communication services can include cellular services, wireless services, such as RF identification (RFID) tracking, Wireless Fidelity (Wi-Fi), local area network (LAN), wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote antenna units (RAUs) 104(1)-104(N) connected to a head-end equipment (HEE) 106 (e.g., a head-end controller, a head-end unit (HEU), or a central unit). The HEE 106 may be communicatively coupled to a signal source 108, for example, a base transceiver station (BTS) or a baseband unit (BBU). In this regard, the HEE 106 receives downlink communications signals 110D from the signal source 108 to be distributed to the RAUs 104(1)-104(N). The RAUs 104(1)-104(N) are configured to receive the downlink communications signals 110D from the HEE 106 over a communications medium 112 to be distributed to the respective remote coverage areas 100(1)-100(N) of the RAUs 104(1)-104(N). In a non-limiting example, the communications medium 112 may be a wired communications medium, a wireless communications medium, or an optical fiber-based communications medium. Each of the RAUs 104(1)-104(N) may include an RF transmitter/receiver (not shown) and a respective antenna 114(1)-114(N) operably connected to the RF transmitter/receiver to wirelessly distribute the communication services to client devices 116 within the respective remote coverage areas 100(1)-100(N).

The RAUs 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective RAUs 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the RAUs 104(1)-104(N) mainly determine the size of the respective remote coverage areas 100(1)-100(N).

In a non-limiting example, the RAUs 104(1)-104(N) are configured to wirelessly distribute the downlink communications signals 110D to the client devices 116 based on long-term evolution (LTE) technology. In this regard, the downlink communications signals 110D may occupy different LTE channels of respective bandwidths. For example, a first LTE channel occupies a respective bandwidth of five megahertz (5 MHz) while a second LTE channel occupies a respective bandwidth of twenty megahertz (20 MHz). In this regard, if the downlink communications signals 110D are transmitted in the first LTE channel and the second LTE channel with a power level P, a channel power density of the first LTE channel is P/(5 MHz), while a channel power density of the second LTE channel will be P/(20 MHz). In this regard, the first LTE channel has a higher channel power density than the second LTE channel. As a result, the downlink communications signals 110D transmitted in the first LTE channel may achieve a longer coverage range than the downlink communications signals 110D transmitted in the second LTE channel. As such, it may be desirable to transmit the downlink communications signals 110D in both the first LTE channel and the second LTE channel with similar coverage range.

No admission is made that any reference cited herein constitutes prior art. Applicant expressly reserves the right to challenge the accuracy and pertinency of any cited documents.

SUMMARY

Embodiments of the disclosure relate to selective multichannel amplification in a distributed antenna system (DAS). In this regard, a remote antenna unit (RAU) in the DAS is configured to receive a plurality of downlink digital signals associated with a plurality of downlink channels having respective downlink channel bandwidths. The RAU is configured to digitally scale the downlink digital signals based on respective digital scaling factors to generate a plurality of scaled downlink digital signals having a substantially equal channel power density in the downlink channels. By digitally scaling the downlink digital signals to provide the substantially equal channel power density in the downlink channels, it is possible to provide substantially uniform radio frequency (RF) coverage range across the downlink channels, thus helping to improve overall RF coverage and user experience in a coverage area of the RAU in the DAS.

In one embodiment, an RAU in a DAS is provided. The RAU comprises a plurality of channel circuits. The plurality of channel circuits is configured to receive a plurality of downlink digital signals at a plurality of signal power levels to be communicated in a plurality of downlink channels having a plurality of downlink channel bandwidths, respectively. The plurality of channel circuits is also configured to digitally scale the plurality of downlink digital signals based on a plurality of digital scaling factors determined according to the plurality of downlink channel bandwidths to generate a plurality of scaled downlink digital signals having a substantially equal channel power density in the plurality of downlink channels.

In another embodiment, a method for digitally scaling a plurality of downlink digital signals in an RAU in a DAS is provided. The method comprises receiving the plurality of downlink digital signals at a plurality of signal power levels to be communicated in a plurality of downlink channels having a plurality of downlink channel bandwidths, respectively. The method also comprises digitally scaling the plurality of downlink digital signals based on a plurality of digital scaling factors determined according to the plurality of downlink channel bandwidths to generate a plurality of scaled downlink digital signals having a substantially equal channel power density in the plurality of downlink channels.

In another embodiment, a DAS is provided. The DAS comprises a central unit. The DAS also comprises a plurality of RAUs. The plurality of RAUs is configured to receive a plurality of downlink digital communications signals from the central unit. The plurality of RAUs is also configured to provide a plurality of uplink digital communications signals to the central unit. One or more RAUs among the plurality of RAUs each comprises a plurality of channel circuits. The plurality of channel circuits is configured to receive a plurality of downlink digital signals at a plurality of signal power levels to be communicated in a plurality of downlink channels having a plurality of downlink channel bandwidths, respectively. The plurality of channel circuits is also configured to digitally scale the plurality of downlink digital signals based on a plurality of digital scaling factors determined according to the plurality of downlink channel bandwidths to generate a plurality of scaled downlink digital signals having a substantially equal channel power density in the plurality of downlink channels.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiments, and together with the description serve to explain principles and operation of the various embodiments.

BRIEF DESCRIPTION OF THE DRAWINGS

FIG. 2B is a schematic diagram providing an exemplary illustration of respective signal power levels of the downlink digital signals and a total signal power level of the combined downlink digital signal of FIG. 2A;

FIG. 2C is a schematic diagram providing an exemplary illustration of respective channel power densities of the downlink digital signals of FIG. 2B;

FIG. 3B is a schematic diagram providing an exemplary illustration of scaled channel power levels as a result of digital scaling;

FIG. 3C is a schematic diagram providing an exemplary illustration of the channel power densities of the scaled downlink digital signals of FIG. 3A;

DETAILED DESCRIPTION

Embodiments of the disclosure relate to selective multi-channel amplification in a distributed antenna system (DAS). In this regard, a remote antenna unit (RAU) in the DAS is configured to receive a plurality of downlink digital signals associated with a plurality of downlink channels having respective downlink channel bandwidths. The RAU is configured to digitally scale the downlink digital signals based on respective digital scaling factors to generate a plurality of scaled downlink digital signals having a substantially equal channel power density in the downlink channels. By digitally scaling the downlink digital signals to provide the substantially equal channel power density in the downlink channels, it is possible to provide substantially uniform radio frequency (RF) coverage range across the downlink channels, thus helping to improve overall RF coverage and user experience in a coverage area of the RAU in the DAS.

Figure 1:
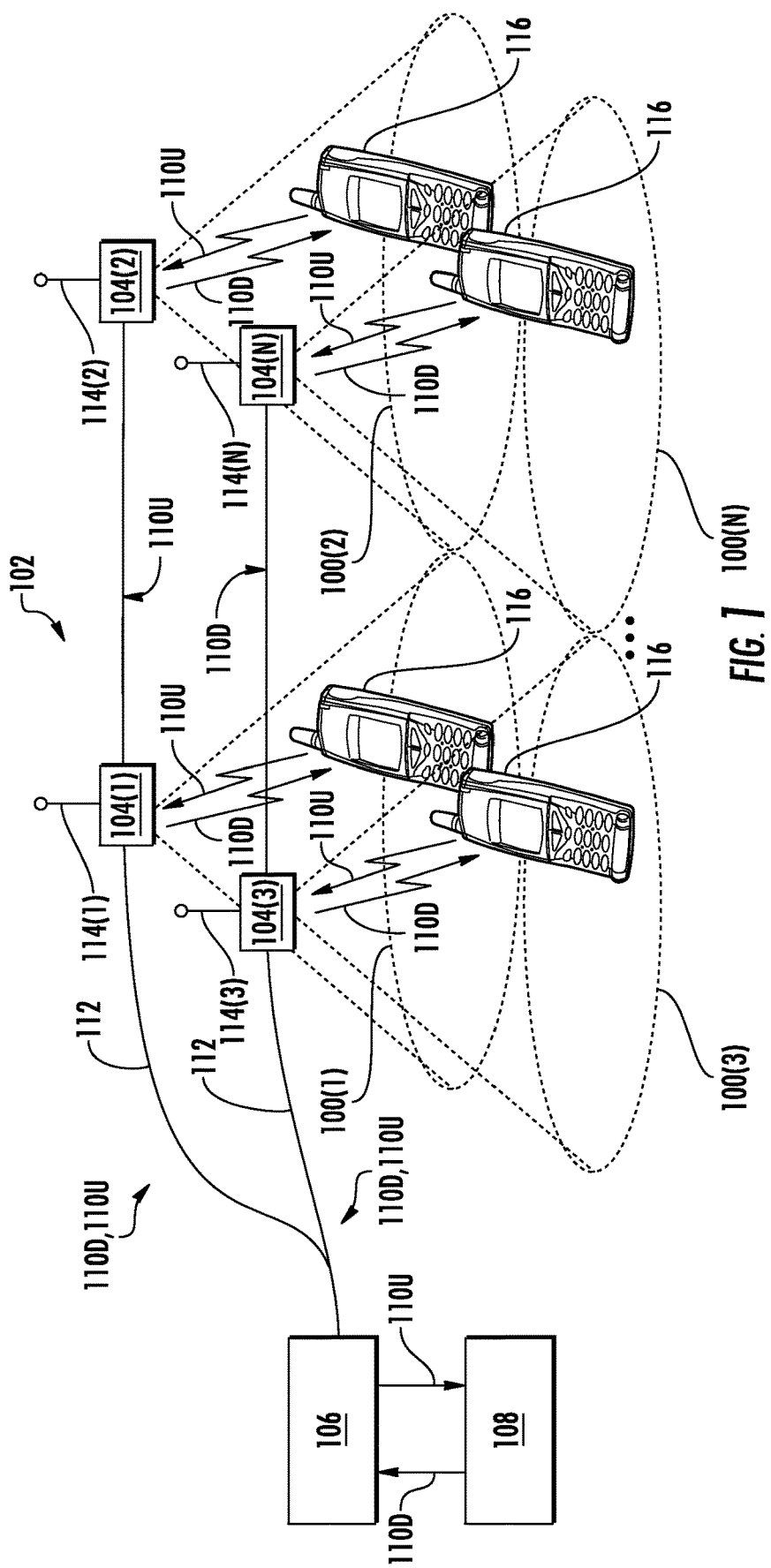
FIG. 1 is a schematic diagram of an exemplary distributed antenna system (DAS)
Figure 2A:
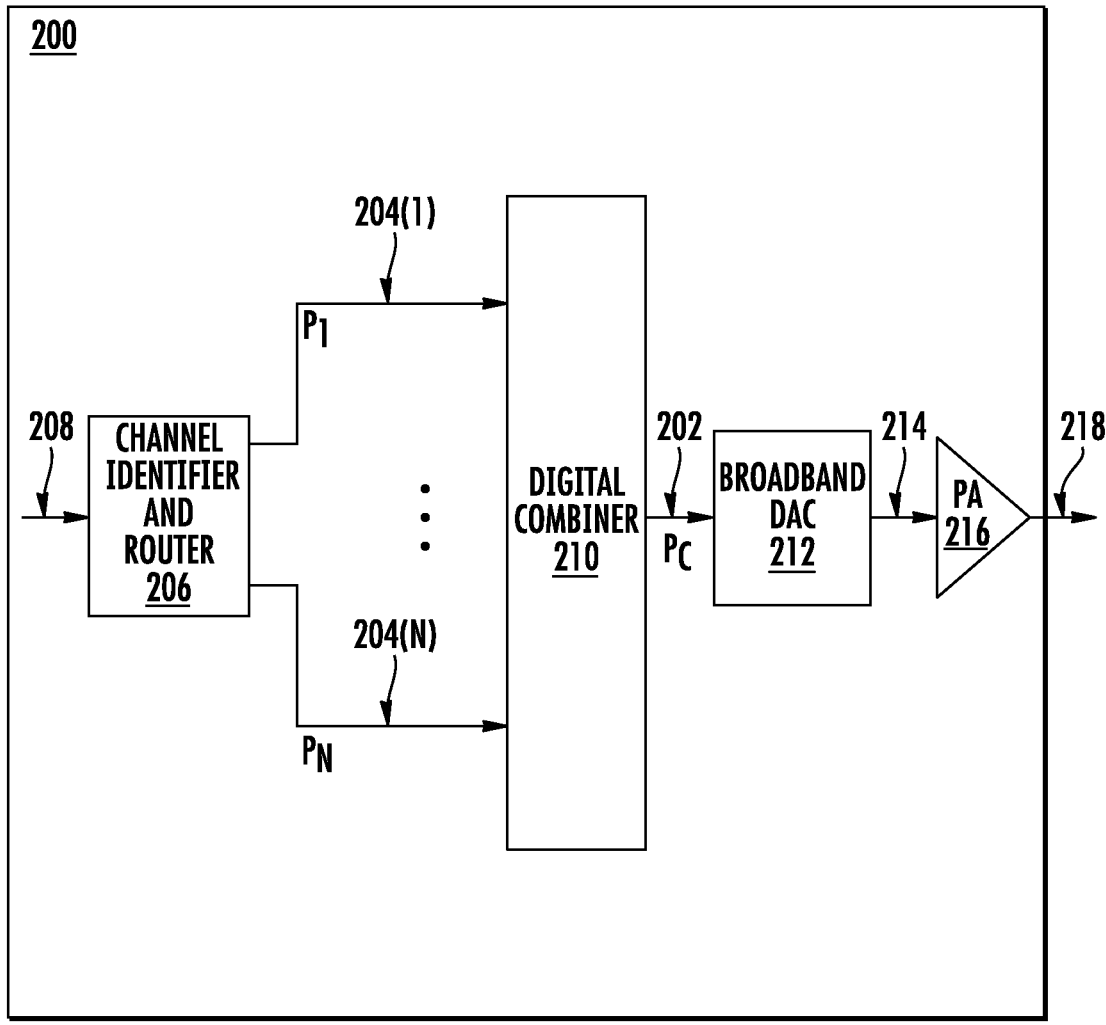
FIG. 2A is a schematic diagram of an exemplary conventional remote antenna unit (RAU) configured to generate a combined downlink digital signal based on a plurality of downlink digital signals.

Before discussing exemplary aspects of selective multi-channel amplification in a DAS that includes specific aspects of the present disclosure, a brief overview of a conventional RAU without the capability of digitally scaling downlink digital signals based on respective downlink channel bandwidths is first provided in reference to FIGS. 2A-2C. The discussion of specific exemplary aspects of selective multi-channel amplification in a DAS starts with reference to FIG. 3A.

In this regard, FIG. 2A is a schematic diagram of an exemplary conventional RAU 200 configured to generate a combined downlink digital signal 202 based on a plurality of downlink digital signals 204(1)-204(N). The conventional RAU 200 includes a channel identifier and router 206 configured to receive a downlink digital communications signal 208 and split the downlink digital communications signal 208 into the downlink digital signals 204(1)-204(N). The conventional RAU 200 includes a digital combiner 210 configured to combine the downlink digital signals 204(1)-204(N) to generate the combined downlink digital signal 202. The conventional RAU 200 also includes a broadband digital-to-analog converter (DAC) 212 configured to convert the combined downlink digital signal 202 into a downlink analog RF signal 214. The conventional RAU 200 further includes a power amplifier (PA) 216 configured to amplify the downlink analog RF signal 214 to generate a downlink RF communications signal 218. The digital combiner 210 receives the downlink digital signals 204(1)-204(N) at respective signal power levels $P_1$-$P_N$ and generates the combined downlink digital signal 202 at a total signal power level $P_C$, as further illustrated in FIG. 2B. For the convenience of illustration, the downlink digital signal 204(1) and the downlink digital signal 204(N) are referenced hereinafter as non-limiting examples.

In this regard, FIG. 2B is a schematic diagram providing an exemplary illustration of the respective signal power level $P_1$ of the downlink digital signal 204(1), the respective signal power level $P_N$ of the downlink digital signal 204(N), and the total signal power level $P_C$ of the combined downlink digital signal 202 of FIG. 2A. Common elements between FIGS. 2A and 2B are shown therein with common element numbers and will not be re-described herein.

With reference to FIG. 2B, the downlink digital signals 204(1), 204(N) may be communicated in respective downlink channels of different downlink channel bandwidths. For example, the downlink digital signal 204(1) may be communicated in a respective downlink channel having a downlink channel bandwidth $BW_1$ of five megahertz (5 MHz). The downlink digital signal 204(N) may be communicated in a respective downlink channel having downlink channel bandwidth $BW_N$ of twenty megahertz (20 MHz). In a non-limiting example, the downlink digital signals 204(1), 204(N) have the same signal power level $P_1$, $P_N$ of approximately negative thirty-five decibel-milliwatts (−35 dBm). Accordingly, the total signal power level $P_C$ of the combined downlink digital signal 202 is approximately negative thirty-two decibel-milliwatts (−32 dBm).

A respective channel power density of the downlink digital signal 204(1) is proportionally related to the respective signal power level $P_1$ and inversely related to the downlink channel bandwidth $BW_1$. Likewise, a respective channel power density of the downlink digital signal 204(N) is proportionally related to the respective signal power level $P_N$ and inversely related to the downlink channel bandwidth $BW_N$. In this regard, since the downlink digital signals 204(1), 204(N) are at the same signal power level $P_1$, $P_N$ of approximately −35 dBm, the respective channel power densities of the downlink digital signals 204(1), 204(N) will depend inversely upon the downlink channel bandwidths $BW_1$, $BW_N$, respectively. As a result, the respective channel power density of the downlink digital signal 204(1), which is associated with the downlink channel bandwidth $BW_1$ of 5 MHz, will be higher than the respective channel power density of the downlink digital signal 204(N), which is associated with the downlink channel bandwidth $BW_N$ of 20 MHz. FIG. 2C is a schematic diagram providing an exemplary illustration of the respective channel power densities of the downlink digital signals 204(1), 204(N) of FIG. 2B.

As illustrated in FIG. 2C, the respective channel power density of the downlink digital signal 204(1) is higher than the respective channel power density of the downlink digital signal 204(N) due to the difference between the respective downlink channel bandwidths $BW_1$, $BW_N$. As a result, the downlink digital signal 204(1) could potentially reach a distance farther than the downlink digital signal 204(N). However, in some deployments, it may be necessary to configure the conventional RAU 200 to provide uniform RF coverage across multiple downlink channels associated with different downlink channel bandwidths. As such, it may be desirable to transmit the downlink digital signals 204(1)-204(N) in associated downlink channels with a substantially equal channel power density.

Figure 3A:
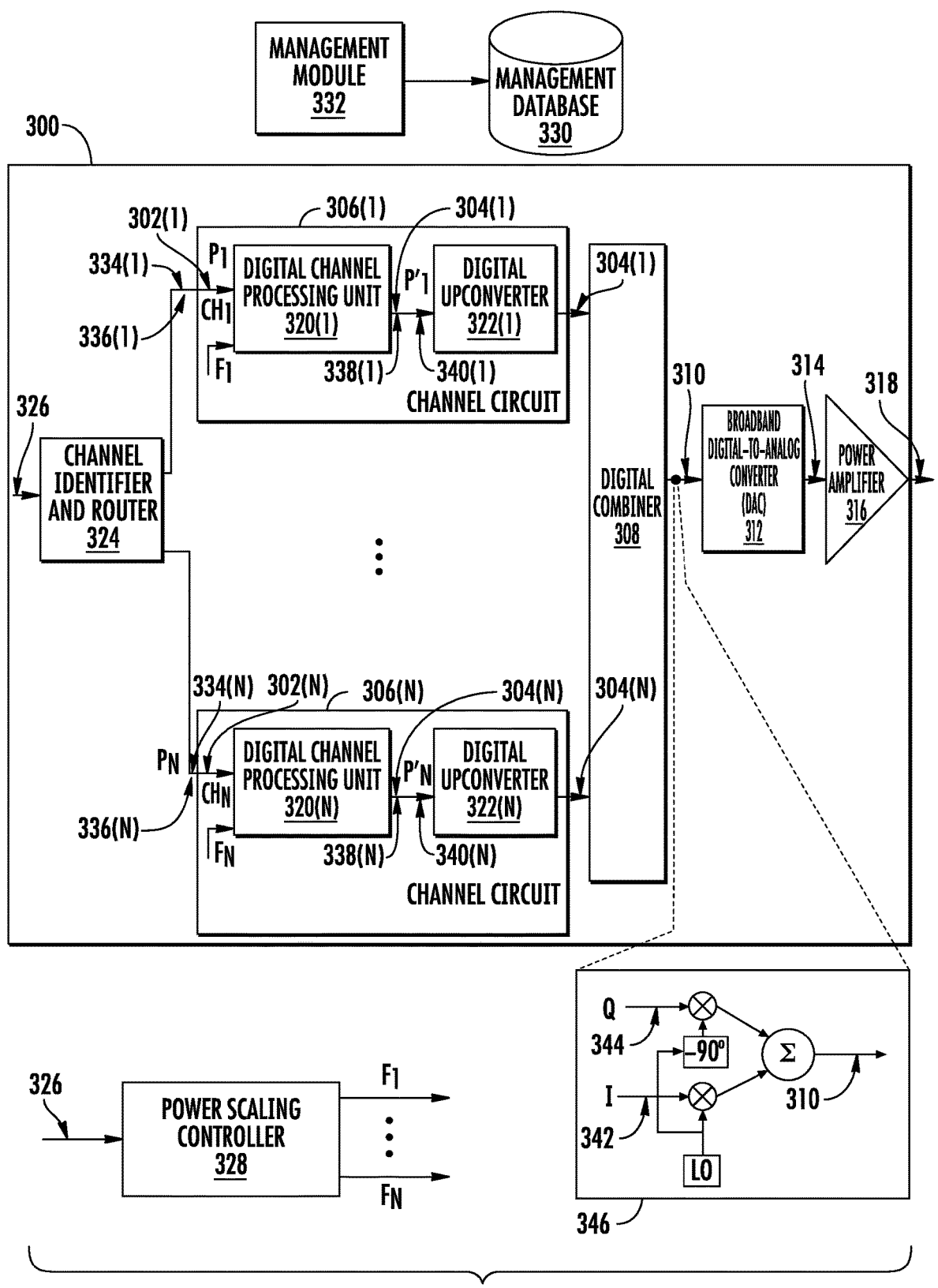
FIG. 3A is a schematic diagram of an exemplary RAU configured to digitally scale a plurality of downlink digital signals based on a plurality of digital scaling factors to generate a plurality of scaled downlink digital signals having a substantially equal channel power density in a plurality of downlink channels.

In this regard, FIG. 3A is a schematic diagram of an exemplary RAU 300 configured to digitally scale a plurality of downlink digital signals 302(1)-302(N) based on a plurality of digital scaling factors $F_1$-$F_N$ to generate a plurality of scaled downlink digital signals 304(1)-304(N) having a substantially equal channel power density in a plurality of downlink channels $CH_1$-$CH_N$. The RAU 300 includes a plurality of channel circuits 306(1)-306(N) configured to receive the downlink digital signals 302(1)-302(N) at a plurality of signal power levels $P_1$-$P_N$ to be communicated in the downlink channels $CH_1$-$CH_N$, respectively. The downlink channels $CH_1$-$CH_N$ correspond to a plurality of downlink channel bandwidths $BW_1$-$BW_N$, respectively. In a non-limiting example, the signal power levels $P_1$-$P_N$ of the downlink digital signals 302(1)-302(N) are substantially equal. As such, according to previous discussion in FIG. 2B, channel power densities $D_1$-$D_N$ of the downlink digital signals 302(1)-302(N) in the downlink channels $CH_1$-$CH_N$ are inversely related to the downlink channel bandwidths $BW_1$-$BW_N$. Since the downlink channel bandwidths $BW_1$-$BW_N$ of the downlink channels $CH_1$-$CH_N$ may be different, the channel power densities $D_1$-$D_N$ of the downlink digital signals 302(1)-302(N) in the downlink channels $CH_1$-$CH_N$ could be different as a result. Hence, to be able to provide uniform RF coverage in a coverage area served by the RAU 300, it may be necessary to digitally scale the downlink digital signals 302(1)-302(N) to generate the scaled downlink digital signals 304(1)-304(N) having the substantially equal channel power density in the downlink channels $CH_1$-$CH_N$.

In this regard, the digital scaling factors $F_1$-$F_N$ can be determined based on the downlink channel bandwidths $BW_1$-$BW_N$, as shown in the equation (Eq. 1) below.

$$F_i = \frac{BW_i}{\sum_{i=1}^{i=N} BW_i} \qquad \text{(Eq. 1)}$$

Accordingly, the channel circuits 306(1)-306(N) are configured to digitally scale the downlink digital signals 302(1)-302(N) based on the digital scaling factors $F_1$-$F_N$. In this regard, each of the channel circuits 306(1)-306(N) is configured to mathematically multiply magnitudes of digital samples representing a respective downlink digital signal among the downlink digital signals 302(1)-302(N) by a respective digital scaling factor among the digital scaling factors $F_1$-$F_N$. For example, if the downlink digital signal 302(1) includes one hundred digital samples having one hundred respective magnitudes, the channel circuit 306(1)

will multiply each of the one hundred respective magnitudes by the digital scaling factor $F_1$ to generate the scaled downlink digital signal 304(1). The digital scaling performed by the channel circuits 306(1)-306(N) can cause the scaled downlink digital signals 304(1)-304(N) to have a plurality of scaled signal power levels $P'_1$-$P'_N$ that is proportional to the downlink channel bandwidths $BW_1$-$BW_N$ of the downlink channels $CH_1$-$CH_N$. As a result, it is possible for the scaled downlink digital signals 304(1)-304(N) to have the substantially equal channel power density in the downlink channels $CH_1$-$CH_N$. The RAU 300 includes a digital combiner 308 configured to combine the scaled downlink digital signals 304(1)-304(N) to generate a combined downlink digital signal 310 at a combined signal power level $P_C$. In a non-limiting example, the digital scaling performed by the channel circuits 306(1)-306(N) can cause the combined signal power level $P_C$ to substantially equal each of the signal power levels $P_1$-$P_N$ of the downlink digital signals 302(1)-302(N).

To further illustrate effects of the digital scaling performed by the channel circuits 306(1)-306(N), FIGS. 3B and 3C are discussed next. For the convenience of illustration, FIGS. 3B and 3C are discussed using the downlink digital signal 302(1) and the downlink digital signal 302(N) as non-limiting examples.

FIG. 3B is a schematic diagram providing an exemplary illustration of the scaled channel power levels $P'_1$, $P'_N$ as a result of digital scaling. Common elements between FIGS. 3A and 3B are shown therein with common element numbers and will not be re-described herein.

For the purpose of illustration, it is assumed that the downlink channel bandwidth $BW_1$ of the downlink channel $CH_1$ is 5 MHz and the downlink channel bandwidth $BW_N$ of the downlink channel $CH_N$ is 20 MHz. As such, according to the equation (Eq. 1) above, the digital scaling factor $F_1$ and the digital scaling factor $F_N$ will be twenty percent (20%) and eighty percent (80%), respectively. It is further assumed that the signal power level $P_1$ of the downlink digital signal 302(1) and the signal power level $P_N$ of the downlink digital signal 302(N) are both −35 dBm. Accordingly, the channel circuit 306(1) digitally scales the downlink digital signal 302(1) based on the digital scaling factor $F_1$ to generate the scaled downlink digital signal 304(1) at the scaled signal power level $P'_1$, which is approximately negative forty-two decibel-milliwatts (−42 dBm). Likewise, the channel circuit 306(N) digitally scales the downlink digital signal 302(N) based on the digital scaling factor $F_N$ to generate the scaled downlink digital signal 304(N) at the scaled signal power level $P'_N$, which is approximately negative thirty-six decibel-milliwatts (−36 dBm). As illustrated in FIG. 3B, the combined signal power level $P_C$ of the combined downlink digital signal 310 is approximately −35 dBm, which is approximately equal to the signal power levels $P_1$, $P_N$.

By digitally scaling the signal power levels $P_1$, $P_N$ to the scaled signal power levels $P'_1$, $P'_N$ based on the digital scaling factors $F_1$, $F_N$, the channel power densities $D_1$, $D_N$ of the scaled downlink digital signals 304(1), 304(N) will be substantially equal, as illustrated in FIG. 3C. In this regard, FIG. 3C is a schematic diagram providing an exemplary illustration of the channel power densities $D_1$, $D_N$ of the scaled downlink digital signals 304(1), 304(N) of FIG. 3A. As illustrated in FIG. 3C, the channel power densities $D_1$, $D_N$ of the scaled downlink digital signals 304(1), 304(N) are substantially equal. As a result, the scaled downlink digital signals 304(1), 304(N) are able to provide substantially uniform RF coverage in the coverage area served by the RAU 300 of FIG. 3A.

With reference back to FIG. 3A, the RAU 300 includes a broadband DAC 312 configured to receive and convert the combined downlink digital signal 310 into a downlink analog RF signal 314. The RAU 300 also includes a power amplifier 316 configured to receive and amplify the downlink analog RF signal 314 to generate a downlink RF communications signal 318.

Figure 4:
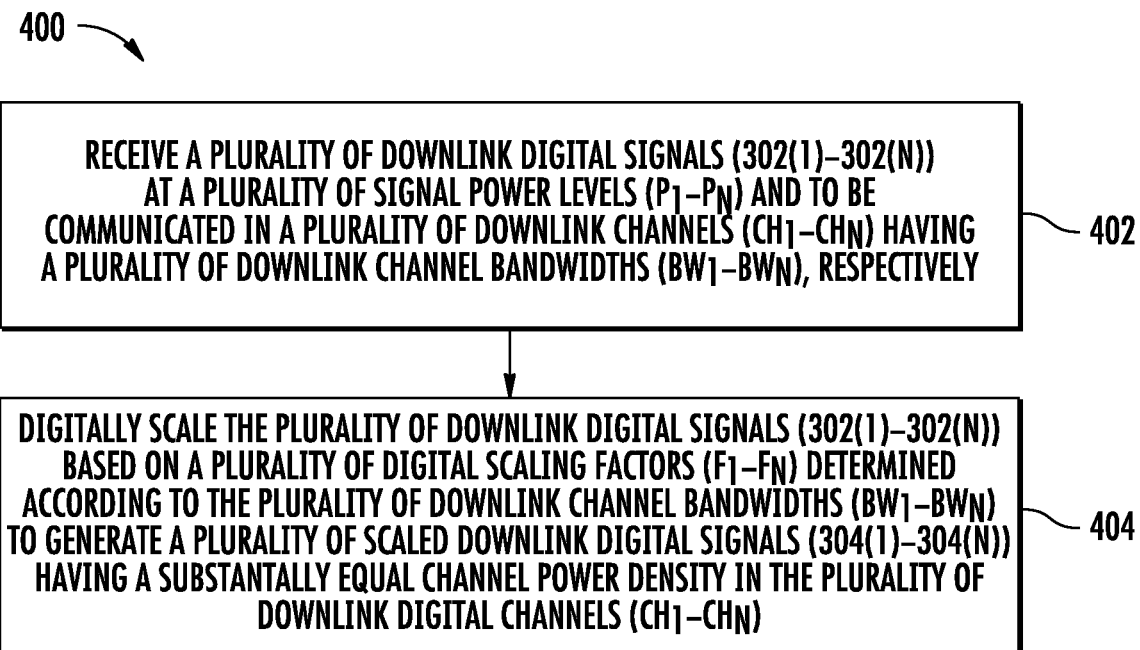
FIG. 4 is a flowchart of an exemplary process that can be performed by the RAU of FIG. 3A to digitally scale the downlink digital signals based on the digital scaling factors.

The RAU 300 can be configured to digitally scale the downlink digital signals 302(1)-302(N) according to a process. In this regard, FIG. 4 is a flowchart of an exemplary process 400 that can be performed by the RAU 300 of FIG. 3A to digitally scale the downlink digital signals 302(1)-302(N) based on the digital scaling factors $F_1$-$F_N$.

According to the process 400, the channel circuits 306(1)-306(N) in the RAU 300 receive the downlink digital signals 302(1)-302(N) at the signal power levels $P_1$-$P_N$ to be communicated in the downlink channels $CH_1$-$CH_N$ having the downlink channel bandwidths $BW_1$-$BW_N$, respectively (block 402). Next, the channel circuits 306(1)-306(N) in the RAU 300 digitally scale the downlink digital signals 302(1)-302(N) based on the digital scaling factors $F_1$-$F_N$ determined according to the downlink channel bandwidths $BW_1$-$BW_N$ to generate the scaled downlink digital signals 304(1)-304(N) having the substantially equal channel power density in the downlink channels $CH_1$-$CH_N$ (block 404).

With reference back to FIG. 3A, the channel circuits 306(1)-306(N) include a plurality of digital channel processing units 320(1)-320(N), respectively. The digital channel processing units 320(1)-320(N) receive the digital scaling factors $F_1$-$F_N$, respectively. The digital channel processing units 320(1)-320(N) are configured to digitally scale the downlink digital signals 302(1)-302(N) based on the digital scaling factors $F_1$-$F_N$ to generate the scaled downlink digital signals 304(1)-304(N) having the substantially equal channel power density in the downlink channels $CH_1$-$CH_N$. The channel circuits 306(1)-306(N) include a plurality of digital upconverters 322(1)-322(N), respectively. The digital upconverters 322(1)-322(N) are configured to digitally upconvert the scaled downlink digital signals 304(1)-304(N) into respective downlink transmission frequencies.

The RAU 300 also includes a channel identifier and router 324. In a non-limiting example, the channel identifier and router 324 can be implemented using a Field Programmable Gate Array (FPGA). In another non-limiting example, the channel identifier and router 324 can be implemented as an embedded software system employing a central processing unit (CPU), storage, and memory. In another non-limiting example, the channel identifier and router 324 can be implemented in the same physical FPGA or embedded system as other components, such as the digital channel processing units 320(1)-320(N). The channel identifier and router 324 can be configured to receive a downlink digital communications signal 326. The channel identifier and router 324 splits the downlink digital communications signal 326 into the downlink digital signals 302(1)-302(N) and routes the downlink digital signals 302(1)-302(N) to the channel circuits 306(1)-306(N), respectively.

In a non-limiting example, the channel identifier and router 324 receives the downlink digital communications signal 326 in common public radio interface (CPRI) format. The channel identifier and router 324 can be configured to examine control fields in CPRI frames conveyed in the downlink digital communications signal 326 to determine the downlink channels $CH_1$-$CH_N$. The channel identifier and router 324 then splits the downlink digital communications signal 326 into the downlink digital signals 302(1)-302(N) based on the downlink channels $CH_1$-$CH_N$.

With continuing reference to FIG. 3A, the RAU 300 may be communicatively coupled to a power scaling controller 328, which may be a FPGA, a CPU, a microprocessor, or a microcontroller. In a non-limiting example, it is possible to provide the power scaling controller 328 in the RAU 300. The power scaling controller 328 is configured to determine the downlink channel bandwidths $BW_1$-$BW_N$ of the downlink digital signals 302(1)-302(N). The power scaling controller 328 is also configured to determine the digital scaling factors $F_1$-$F_N$ based on the downlink channel bandwidths $BW_1$-$BW_N$, respectively. The power scaling controller 328 is also configured to provide the digital scaling factors $F_1$-$F_N$ to the channel circuits 306(1)-306(N) in the RAU 300.

In a non-limiting example, the power scaling controller 328 receives the downlink digital communications signal 326, which is configured to be distributed to the RAU 300, in the CPRI format. In this regard, the power scaling controller 328 examines the control fields in the CPRI frames conveyed in the downlink digital communications signal 326 to determine the downlink channel bandwidths $BW_1$-$BW_N$ of the downlink channels $CH_1$-$CH_N$.

In another non-limiting example, the power scaling controller 328 is communicatively coupled to a management database 330 configured to store configuration information determined by a management module 332. The management module 332, which may be provided inside or outside the RAU 300, is responsible for configuration and ongoing management of the RAU 300. The management module 332 provides, for example, a management interface to enable management of the RAU 300 by an operator. The management interface may be, for example, a human controlled graphical user interface (GUI). Alternatively, the management interface may be, for example, an electronic interface using a scheme such as Simple Network Management Protocol (SNMP) or various automation schemes. The management module 332 stores functional parameters obtained via the management interface in the management database 330.

The functional parameters managed via the management module 332 may include, for example, activating and deactivating the RAU 300, or controlling various configuration parameters. These configuration parameters may include, for example, a specification of the number of channels that the RAU 300 will amplify and the downlink channel bandwidths $BW_1$-$BW_N$ (in, for example, quanta of 100 kiloHertz (Khz)) that the downlink channels $CH_1$-$CH_N$ utilize. The functional parameters stored in the management database 330 may be utilized by the power scaling controller 328 to determine the downlink channel bandwidths $BW_1$-$BW_N$ of the downlink channels $CH_1$-$CH_N$. In addition, the functional parameters stored in the management database 330 may be utilized by the digital channel processing units 320(1)-320(N) to digitally scale the downlink digital signals 302(1)-302(N) based on the digital scaling factors $F_1$-$F_N$.

Upon determining the downlink channel bandwidths $BW_1$-$BW_N$ of the downlink channels $CH_1$-$CH_N$, the power scaling controller 328 calculates a total downlink channel bandwidth $BW_{TOTAL}$ ($BW_{TOTAL} = \Sigma_{i=1}^{i=N} BWi$) of the downlink digital signals 302(1)-302(N). The power scaling controller 328 then determines a digital scaling factor $F_1$ for each of the downlink digital signals 302(1)-302(N) according to the equation (Eq. 1) above.

Figure 5:
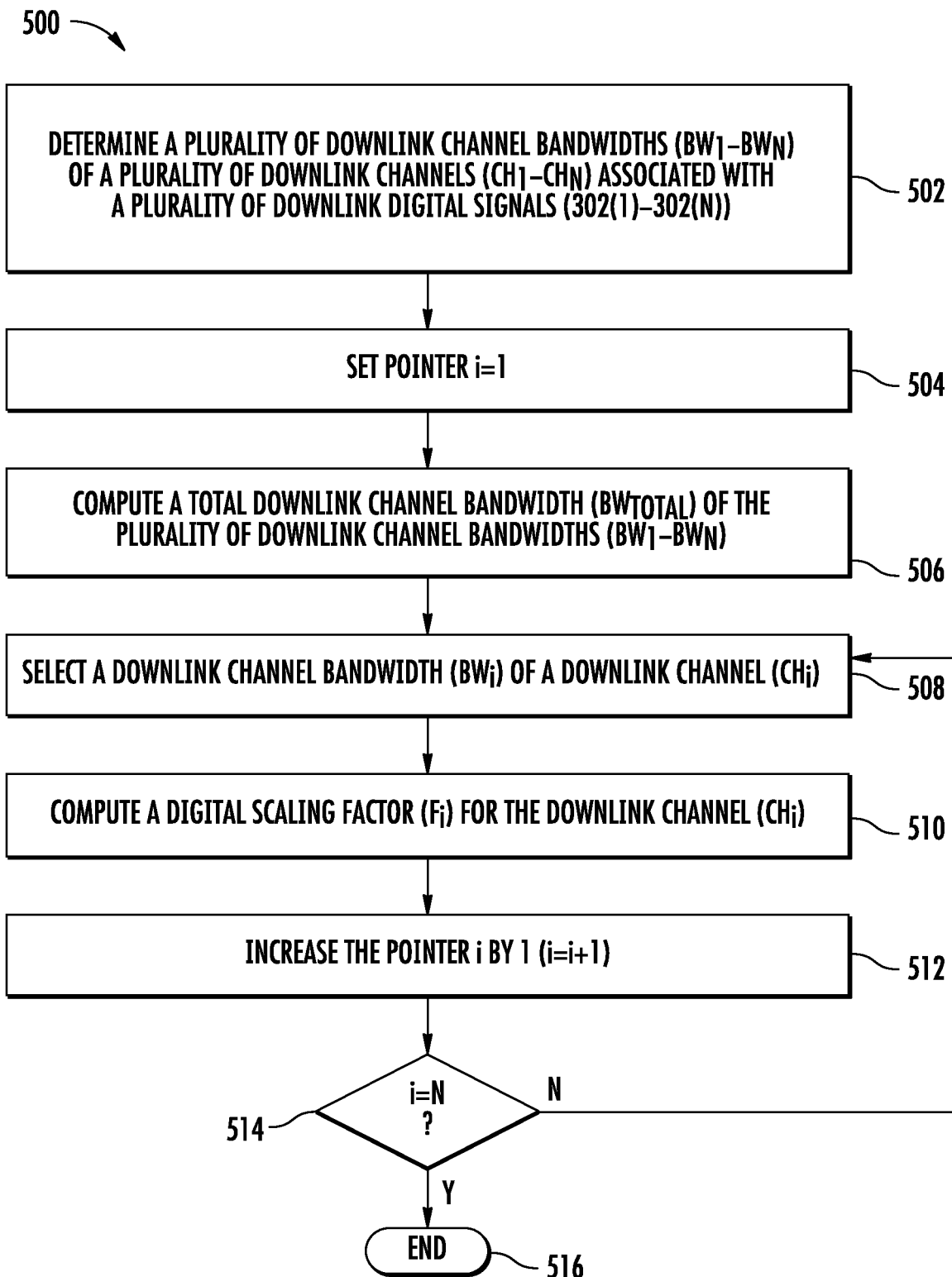
FIG. 5 is a flowchart of an exemplary process that a power scaling controller may employ to determine the digital scaling factors of FIG. 3A.

The power scaling controller 328 may determine the digital scaling factors $F_1$-$F_N$ according to a process. In this regard, FIG. 5 is a flowchart of an exemplary process 500 that the power scaling controller 328 may employ to determine the digital scaling factors $F_1$-$F_N$ of FIG. 3A. With reference to FIG. 5, the power scaling controller 328 determines the downlink channel bandwidths $BW_1$-$BW_N$ of the downlink channels $CH_1$-$CH_N$ associated with the downlink digital signals 302(1)-302(N) (block 502). As previously discussed, the power scaling controller 328 may determine the downlink channel bandwidths $BW_1$-$BW_N$ based on the control fields in the CPRI frames conveyed in the downlink digital communications signal 326 and/or functional parameters stored in the management database 330. The power scaling controller 328 sets a pointer i to one (1) (block 504). By setting the pointer i to one (1), the power scaling controller 328 is set to start from the downlink channel $CH_1$ among the downlink channels $CH_1$-$CH_N$. Next, the power scaling controller 328 computes the total downlink channel bandwidth $BW_{TOTAL}$ of the downlink channel bandwidths $BW_1$-$BW_N$ (block 506). As previously discussed, the total downlink channel bandwidth $BW_{TOTAL}$ equals a sum of the downlink channel bandwidths $BW_1$-$BW_N$ ($BW_{TOTAL} = \Sigma_{i=1}^{i=N} BWi$).

The power scaling controller 328 then selects a downlink channel bandwidth $BW_i$ ($1 \leq i \leq N$) among the downlink channel bandwidths $BW_1$-$BW_N$ of a downlink channel $CH_i$ ($1 \leq i \leq N$) among the downlink channels $CH_1$-$CH_N$ (block 508). The power scaling controller 328 then computes a digital scaling factor $F_i$ ($1 \leq i \leq N$) for the downlink channel $CH_i$ ($1 \leq i \leq N$) (block 510). The power scaling controller 328 then increases the pointer i by one (1) (i=i+1) (block 512). The power scaling controller 328 then checks whether the pointer i equals N (block 514). If the pointer i is less than N, the power scaling controller 328 returns to block 508 to compute a next digital scaling factor. Otherwise, the power scaling controller 328 ends the process (block 516).

Figure 6:
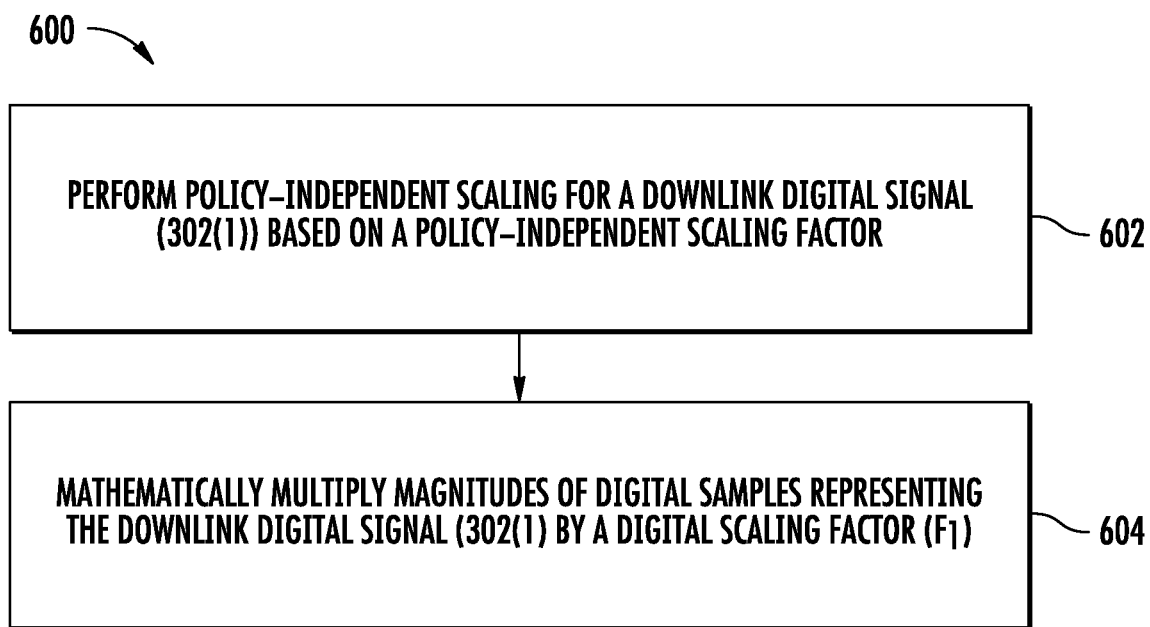
FIG. 6 is a flowchart of an exemplary process that a plurality of digital channel processing units in the RAU of FIG. 3A may perform to digitally scale the downlink digital signals.

With reference back to FIG. 3A, the digital channel processing units 320(1)-320(N) can be configured to digitally scale the downlink digital signals 302(1)-302(N) according to a process. In this regard, FIG. 6 is a flowchart of an exemplary process 600 that the digital channel processing units 320(1)-320(N) in the RAU 300 of FIG. 3A may perform to digitally scale the downlink digital signals 302(1)-302(N). For the convenience of discussion, the digital channel processing unit 320(1) configured to digitally scale the downlink digital signal 302(1) is referenced herein as a non-limiting example. It shall be appreciated that the process 600 can be employed by any of the digital channel processing units 320(1)-320(N) in the RAU 300.

According to the process 600, the digital channel processing unit 320(1) performs policy-independent scaling on the downlink digital signal 302(1) based on a policy-independent scaling factor (block 602). In a non-limiting example, the policy-independent scaling can help reduce magnitude (e.g., amplitude) of the downlink digital signal 302(1) to prevent gain compression in the power amplifier 316 of FIG. 3A. Next, the digital channel processing unit 320(1) performs digital scaling by mathematically multiplying the magnitudes of digital samples representing the downlink digital signal 302(1) by the digital scaling factor $F_1$ (block 604). In a non-limiting example, it is possible to perform the policy-independent scaling (block 602) and the digital scaling (block 604) in a single scaling operation based on a combined scaling factor. In this regard, the combined scaling factor may be determined by multiplying the policy-independent scaling factor with the digital scaling factor $F_1$.

With reference back to FIG. 3A, the downlink digital signals 302(1)-302(N) include a plurality of in-phase (I) sample signals 334(1)-334(N) and a plurality of quadrature (Q) sample signals 336(1)-336(N), respectively. In this regard, the channel circuits 306(1)-306(N) receive the I sample signals 334(1)-334(N) and the Q sample signals 336(1)-336(N) as the downlink digital signals 302(1)-302(N). Accordingly, the channel circuits 306(1)-306(N) are configured to digitally scale the I sample signals 334(1)-334(N) based on the digital scaling factors $F_1$-$F_N$ to generate a plurality of scaled I sample signals 338(1)-338(N), respectively. The channel circuits 306(1)-306(N) are also configured to digitally scale the Q sample signals 336(1)-336(N) based on the digital scaling factors $F_1$-$F_N$ to generate a plurality of scaled Q sample signals 340(1)-340(N), respectively.

Subsequently, the digital upconverters 322(1)-322(N) digitally upconvert the scaled I sample signals 338(1)-338(N) and the scaled Q sample signals 340(1)-340(N) into the respective downlink transmission frequencies. The digital combiner 308 combines the scaled I sample signals 338(1)-338(N) to generate a combined downlink I sample signal 342. The digital combiner 308 also combines the scaled Q sample signals 340(1)-340(N) to generate a combined downlink Q sample signal 344.

In a non-limiting example, the RAU 300 further includes an I-Q combiner 346 coupled to the digital combiner 308. The I-Q combiner 346 is configured to combine the combined downlink I sample signal 342 and the combined downlink Q sample signal 344 to generate the combined downlink digital signal 310. The broadband DAC 312 converts the combined downlink digital signal 310 into the downlink analog RF signal 314.

With continuing reference to FIG. 3A, in a non-limiting example, the I-Q combiner 346 can also be configured to include a mixer that performs functions of the broadband DAC 312. In this regard, the I-Q combiner 346 is able to convert the combined downlink digital signal 310 into the downlink analog RF signal 314.

In one non-limiting example, the RAU 300 may include a plurality of the power amplifier 316 and/or a plurality of the digital combiner 308. As such, each power amplifier 316 amplifies a particular range of frequencies. Each of the channel circuits 306(1)-306(N) may be coupled to a respective digital combiner 308 according to the downlink channels $CH_1$-$CH_N$. In this manner, each of the downlink channels $CH_1$-$CH_N$ is amplified by a respective power amplifier 316.

In another non-limiting example, the RAU 300 may include a plurality of the broadband DAC 312 coupled directly to the channel circuits 306(1)-306(N), respectively. In this regard, the broadband DAC 312 receives and converts the scaled downlink digital signals 304(1)-304(N) into respective downlink analog RF signals. As such, the digital combiner 308 may be replaced by an analog combiner disposed between the broadband DAC 312 and the power amplifier 316.

Figure 7:
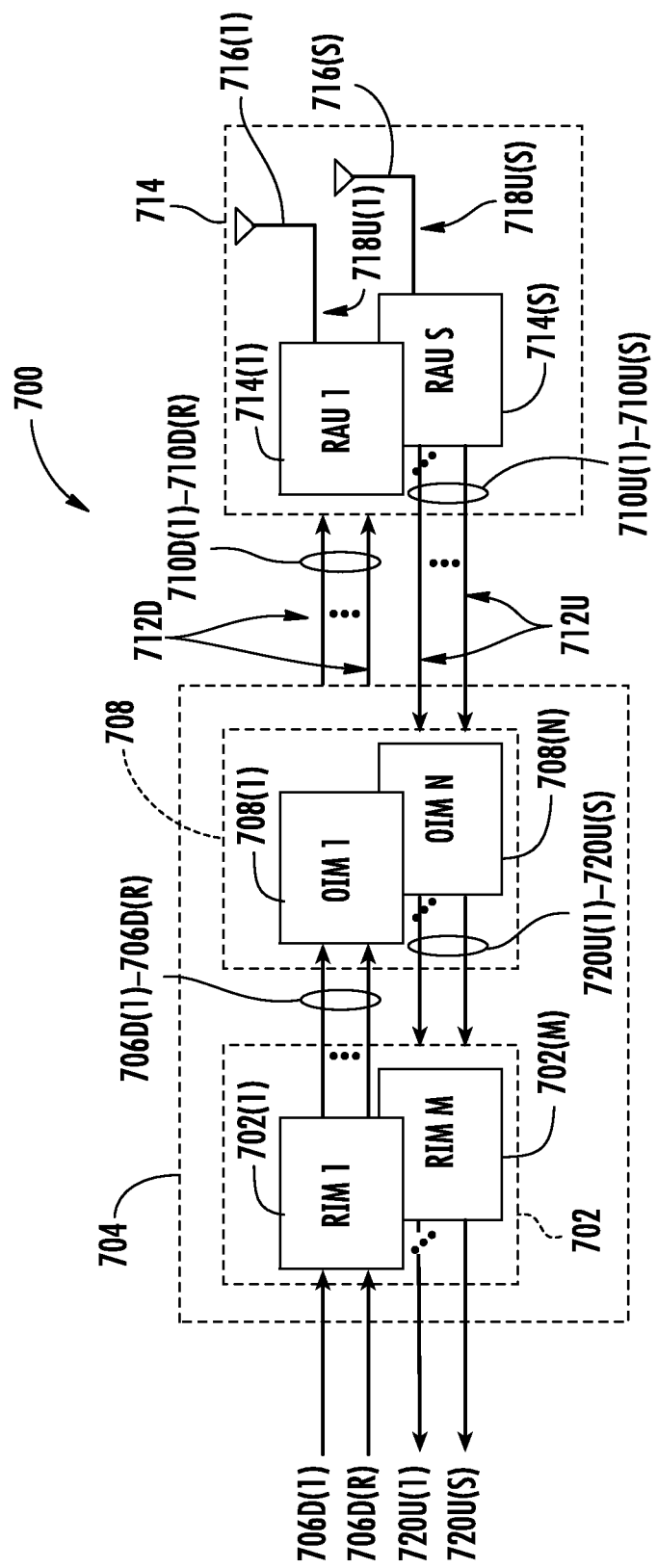
FIG. 7 is a schematic diagram of an exemplary DAS provided in the form of an optical fiber-based DAS that includes one or more of the RAU of FIG. 3A configured to digitally scale the downlink digital signals based on the digital scaling factors.

FIG. 7 is a schematic diagram of an exemplary DAS 700 provided in the form of an optical fiber-based DAS that includes a plurality of the RAU 300 of FIG. 3A configured to digitally scale the downlink digital signals 302(1)-302(N) based on the digital scaling factors $F_1$-$F_N$. The DAS 700 includes an optical fiber for distributing communications services for multiple frequency bands. The DAS 700 in this example is comprised of three (3) main components. A plurality of radio interfaces provided in the form of radio interface modules (RIMs) 702(1)-702(M) are provided in a head-end unit (HEU) 704 to receive and process downlink digital communications signals 706D(1)-706D(R) prior to optical conversion into downlink optical fiber-based communications signals. The downlink digital communications signals 706D(1)-706D(R) may be received from a base station (not shown) as an example. The RIMs 702(1)-702(M) provide both downlink and uplink interfaces for signal processing. The notations "1-R" and "1-M" indicate that any number of the referenced component, 1-R and 1-M, respectively, may be provided. The HEU 704 is configured to accept the RIMs 702(1)-702(M) as modular components that can easily be installed and removed or replaced in the HEU 704. In one example, the HEU 704 is configured to support up to twelve (12) RIMs 702(1)-702(12). Each RIM 702(1)-702(M) can be designed to support a particular type of radio source or range of radio sources (i.e., frequencies) to provide flexibility in configuring the HEU 704 and the DAS 700 to support the desired radio sources.

For example, one RIM 702 may be configured to support the Personalized Communications System (PCS) radio band. Another RIM 702 may be configured to support the 800 megahertz (MHz) radio band. In this example, by inclusion of the RIMs 702(1)-702(M), the HEU 704 could be configured to support and distribute communications signals on both PCS and Long-Term Evolution (LTE) 700 radio bands, as an example. The RIMs 702 may be provided in the HEU 704 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 702(1)-702(M) may also be provided in the HEU 704 that support any wireless technologies desired, including but not limited to Code Division Multiple Access (CDMA), CDMA200, 1×RTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 702(1)-702(M) may be provided in the HEU 704 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 7, the downlink digital communications signals 706D(1)-706D(R) are provided to a plurality of optical interfaces provided in the form of optical interface modules (OIMs) 708(1)-708(N) in this embodiment to convert the downlink digital communications signals 706D(1)-706D(R) into downlink optical fiber-based communications signals 710D(1)-710D(R). The notation "1-N" indicates that any number of the referenced component 1-N may be provided. The OIMs 708(1)-708(N) may be configured to provide a plurality of optical interface components (OICs) that contain optical-to-electrical (O/E) and electrical-to-optical (E/O) converters, as will be described in more detail below. The OIMs 708(1)-708(N) support the radio bands that can be provided by the RIMs 702(1)-702 (M), including the examples previously described above.

The OIMs 708(1)-708(N) each include E/O converters to convert the downlink digital communications signals 706D (1)-706D(R) into the downlink optical fiber-based communications signals 710D(1)-710D(R). The downlink optical fiber-based communications signals 710D(1)-710D(R) are communicated over a downlink optical fiber-based communications medium 712D to a plurality of remote antenna units (RAUs) 714(1)-714(S). A plurality of RAUs among the RAUs 714(1)-714(S) are provided as the RAU 300 of FIG. 3A configured to digitally scale the downlink digital signals 302(1)-302(N) based on the digital scaling factors $F_1$-$F_N$. The notation "1-S" indicates that any number of the referenced component 1-S may be provided. RAU O/E converters provided in the RAUs 714(1)-714(S) convert the downlink optical fiber-based communications signals 710D(1)-710D(R) back into the downlink digital communications signals 706D(1)-706D(R), which are provided to antennas 716(1)-716(S) in the RAUs 714(1)-714(S) to client devices (not shown) in the reception range of the antennas 716(1)-716(S).

RAU E/O converters are also provided in the RAUs 714(1)-714(S) to convert uplink digital communications signals 718U(1)-718U(S) received from the client devices through the antennas 716(1)-716(S) into uplink optical fiber-based communications signals 710U(1)-710U(S). The RAUs 714(1)-714(S) communicate the uplink optical fiber-based communications signals 710U(1)-710U(S) over an uplink optical fiber-based communications medium 712U to the OIMs 708(1)-708(N) in the HEU 704. The OIMs 708 (1)-708(N) include O/E converters that convert the received uplink optical fiber-based communications signals 710U(1)-710U(S) into uplink digital communications signals 720U (1)-720U(S), which are processed by the RIMs 702(1)-702 (M) and provided as the uplink digital communications signals 720U(1)-720U(S). The HEU 704 may provide the uplink digital communications signals 720U(1)-720U(S) to a base station or other communications system.

Note that the downlink optical fiber-based communications medium 712D and the uplink optical fiber-based communications medium 712U connected to each RAU 714(1)-714(S) may be a common optical fiber-based communications medium, wherein for example, wave division multiplexing (WDM) is employed to provide the downlink optical fiber-based communications signals 710D(1)-710D(R) and the uplink optical fiber-based communications signals 710U(1)-710U(S) on the same optical fiber-based communications medium.

The DAS 700 further includes the power scaling controller 328 of FIG. 3A configured to determine the digital scaling factors $F_1$-$F_N$ based on the downlink channel bandwidths $BW_1$-$BW_N$. In a non-limiting example, the power scaling controller 328 is provided as an independent entity in the DAS 700. In another non-limiting example, the power scaling controller 328 is provided in the HEU 704.

Figure 8:
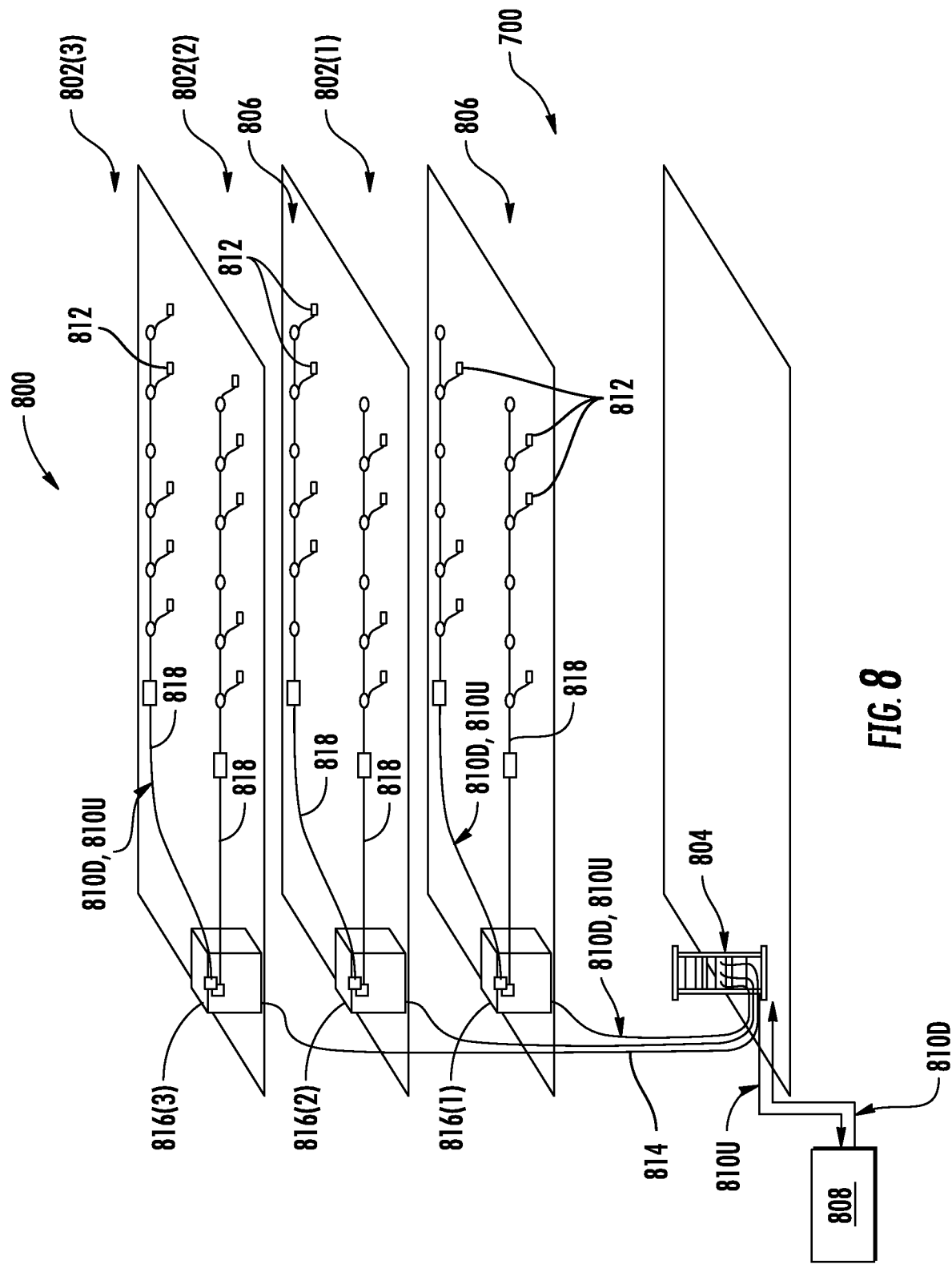
FIG. 8 is a partial schematic cut-away diagram of an exemplary building infrastructure in which the DAS of FIG. 7 can be provided.

The DAS 700 of FIG. 7 may be provided in an indoor environment, as illustrated in FIG. 8. FIG. 8 is a partial schematic cut-away diagram of an exemplary building infrastructure 800 in which the DAS 700 of FIG. 7 can be employed. The building infrastructure 800 in this embodiment includes a first (ground) floor 802(1), a second floor 802(2), and a third floor 802(3). The floors 802(1)-802(3) are serviced by an HEU 804 to provide antenna coverage areas 806 in the building infrastructure 800. The HEU 804 is communicatively coupled to a base station 808 to receive downlink communications signals 810D from the base station 808. The HEU 804 is communicatively coupled to a plurality of RAUs 812 to distribute the downlink communications signals 810D to the RAUs 812 and to receive uplink communications signals 810U from the RAUs 812, as previously discussed above. The downlink communications signals 810D and the uplink communications signals 810U communicated between the HEU 804 and the RAUs 812 are carried over a riser cable 814. The riser cable 814 may be routed through interconnect units (ICUs) 816(1)-816(3) dedicated to each of the floors 802(1)-802(3) that route the downlink communications signals 810D and the uplink communications signals 810U to the RAUs 812 and also provide power to the RAUs 812 via array cables 818.

Figure 9:
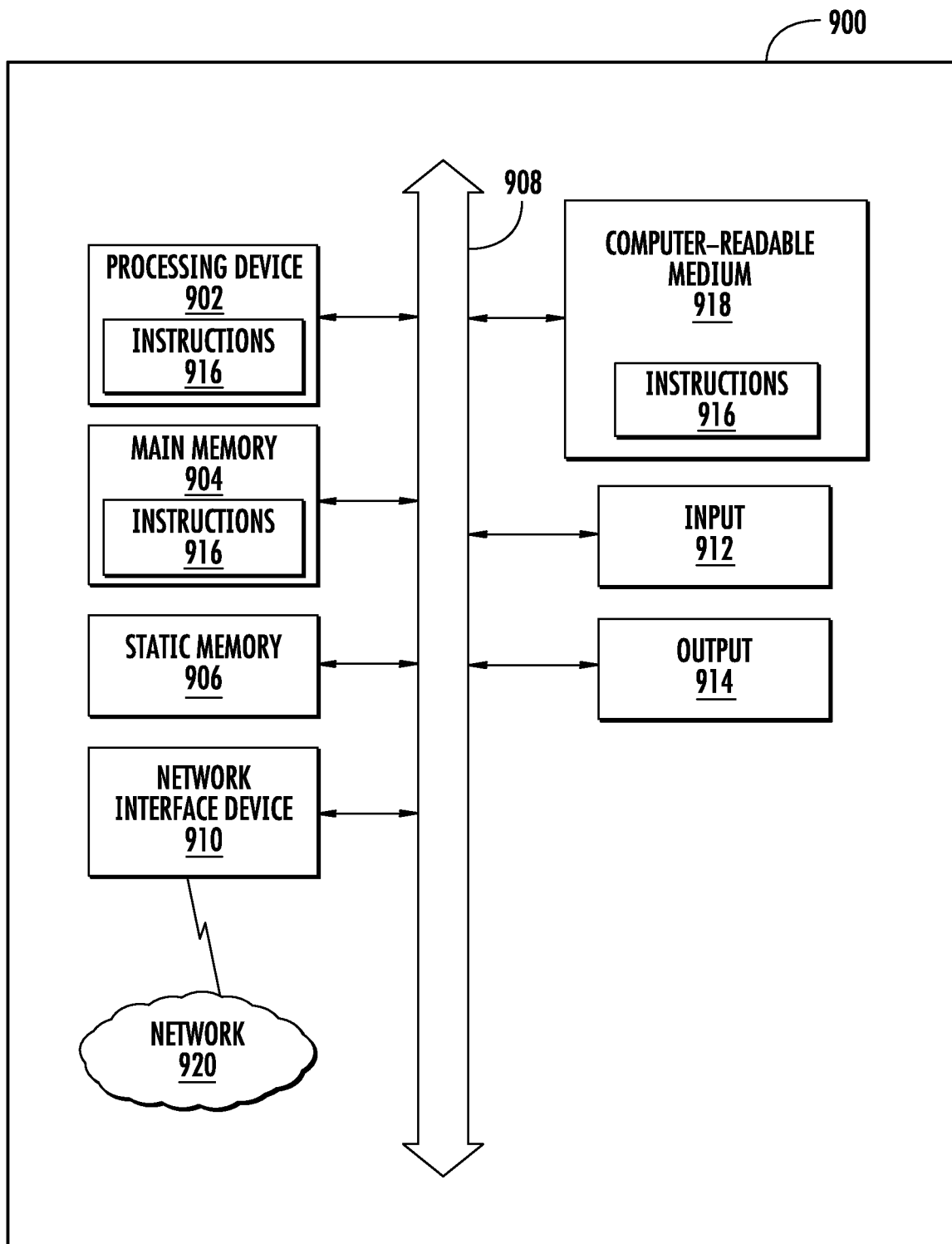
FIG. 9 is a schematic diagram representation of additional detail illustrating an exemplary computer system that could be employed in a control circuit, including a controller in the RAU of FIG. 3A.

FIG. 9 is a schematic diagram representation of additional detail illustrating an exemplary computer system 900 that could be employed in a control circuit, including the power scaling controller 328 and the digital channel processing units 320(1)-320(N) of FIG. 3A for determining the digital scaling factors $F_1$-$F_N$ and performing digital scaling based on the digital scaling factors $F_1$-$F_N$ in the RAU 300. In this regard, the computer system 900 is adapted to execute instructions from an exemplary computer-readable medium to perform these and/or any of the functions or processing described herein.

In this regard, the computer system 900 in FIG. 9 may include a set of instructions that may be executed to predict frequency interference to avoid or reduce interference in a multi-frequency DAS. The computer system 900 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 900 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 900 in this embodiment includes a processing device or processor 902, a main memory 904 (e.g., read-only memory (ROM), flash memory, dynamic random access memory (DRAM), such as synchronous DRAM (SDRAM), etc.), and a static memory 906 (e.g., flash memory, static random access memory (SRAM), etc.), which may communicate with each other via a data bus 908. Alternatively, the processor 902 may be connected to the main memory 904 and/or the static memory 906 directly or via some other connectivity means. The processor 902 may be a controller including the power scaling controller 328 and the digital channel processing units 320(1)-320(N) of FIG. 3A, as an example, and the main memory 904 or the static memory 906 may be any type of memory.

The processor 902 represents one or more general-purpose processing devices, such as a microprocessor, central processing unit, or the like. More particularly, the processor 902 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 902 is configured to execute processing logic in instructions for performing the operations and steps discussed herein.

The computer system 900 may further include a network interface device 910. The computer system 900 also may or may not include an input 912, configured to receive input and selections to be communicated to the computer system 900 when executing instructions. The computer system 900 also may or may not include an output 914, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 900 may or may not include a data storage device that includes instructions 916 stored in a computer-readable medium 918. The instructions 916 may also reside, completely or at least partially, within the main memory 904 and/or within the processor 902 during execution thereof by the computer system 900, the main memory 904 and the processor 902 also constituting computer-readable medium. The instructions 916 may further be transmitted or received over a network 920 via the network interface device 910.

While the computer-readable medium 918 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A distributed communication system, comprising:
a head-end unit (HEU); and
a plurality of remote antenna units (RAUs) configured to:
   receive a plurality of downlink digital communications signals from the central unit; and
   provide a plurality of uplink digital communications signals to the central unit;
wherein one or more RAUs among the plurality of RAUs each comprises a plurality of channel circuits, the plurality of channel circuits configured to:
   receive a plurality of downlink digital signals at a plurality of signal power levels to be communicated in a plurality of downlink channels having a plurality of downlink channel bandwidths, respectively; and
   digitally scale the plurality of downlink digital signals based on a plurality of digital scaling factors determined according to the plurality of downlink channel bandwidths to generate a plurality of scaled downlink digital signals having a substantially equal channel power density in the plurality of downlink channels.

2. The distributed communication system of claim 1, wherein the plurality of channel circuits is configured to receive the plurality of downlink digital signals at the plurality of signal power levels that is substantially equal.

3. The distributed communication system of claim 1, wherein each of the plurality of channel circuits is configured to mathematically multiply magnitudes of digital samples representing a respective downlink digital signal among the plurality of downlink digital signals by a respective digital scaling factor to generate a respective scaled downlink digital signal among the plurality of scaled downlink digital signals.

4. The distributed communication system of claim 3, wherein the plurality of channel circuits comprises a plurality of digital channel processing units, respectively, the plurality of digital channel processing units configured to:
   receive the plurality of digital scaling factors, respectively; and
   digitally scale the plurality of downlink digital signals based on the plurality of digital scaling factors to generate the plurality of scaled downlink digital signals.

5. The distributed communication system of claim 4, wherein the plurality of channel circuits further comprises a plurality of digital upconverters, respectively, the plurality of digital upconverters configured to digitally upconvert the plurality of scaled downlink digital signals into respective downlink transmission frequencies.

6. The distributed communication system of claim 3, wherein each of the one or more RAUs further comprises a digital combiner configured to combine the plurality of scaled downlink digital signals to generate a combined downlink digital signal.

7. The distributed communication system of claim 6, wherein each of the one or more RAUs further comprises:

a broadband digital-to-analog converter (DAC) configured to receive and convert the combined downlink digital signal into a downlink analog radio frequency (RF) signal; and a power amplifier configured to receive and amplify the downlink analog RF signal to generate a downlink RF communications signal.

8. The distributed communication system of claim 6, wherein:
the plurality of downlink digital signals comprises a plurality of in-phase (I) sample signals and a plurality of quadrature (Q) sample signals, respectively; and
the plurality of channel circuits is configured to:
receive the plurality of I sample signals and the plurality of Q sample signals, respectively; and
digitally scale the plurality of I sample signals and the plurality of Q sample signals based on the plurality of digital scaling factors to generate a plurality of scaled I sample signals and a plurality of scaled Q sample signals, respectively; and
the digital combiner is configured to:
combine the plurality of scaled I sample signals to generate a combined downlink I sample signal; and
combine the plurality of scaled Q sample signals to generate a combined downlink Q sample signal.

9. The distributed communication system of claim 8, wherein each of the plurality of RAUs further comprises an I-Q combiner configured to combine the combined downlink I sample signal and the combined downlink Q sample signal to generate the combined downlink digital signal.

10. The distributed communication system of claim 1, wherein each of the one or more RAUs further comprises a channel identifier and router configured to:
receive a downlink digital communications signal among the plurality of downlink digital communications signals;
split the downlink digital communications signal into the plurality of downlink digital signals; and
route the plurality of downlink digital signals to the plurality of channel circuits, respectively.

11. The distributed communication system of claim 10, wherein the channel identifier and router is further configured to:
receive the downlink digital communications signal in common public radio interface (CPRI) format;
examine control fields in CPRI frames conveyed in the downlink digital communications signal to determine the plurality of downlink channels; and
split the downlink digital communications signal into the plurality of downlink digital signals based on the plurality of downlink channels.

12. The distributed communication system of claim 1, further comprising a power scaling controller communicatively coupled to the one or more RAUs, for each of the one or more RAUs, the power scaling controller is configured to:
determine the plurality of downlink channel bandwidths of the plurality of downlink digital signals;
determine the plurality of digital scaling factors based on the plurality of downlink channel bandwidths; and
provide the plurality of digital scaling factors to the plurality of channel circuits.

13. The distributed communication system of claim 12, wherein the power scaling controller is further configured to:
calculate a total downlink channel bandwidth of the plurality of downlink digital signals; and
determine a digital scaling factor for each of the plurality of downlink digital signals by dividing a downlink channel bandwidth of the downlink digital signal by the total downlink channel bandwidth.

14. The distributed communication system of claim 12, wherein for each of the one or more RAUs, the power scaling controller is further configured to:
receive a downlink digital communications signal configured to be distributed to the RAU in common public radio interface (CPRI) format; and
examine control fields in CPRI frames conveyed in the downlink digital communications signal to determine the plurality of downlink channel bandwidths.

15. The distributed communication system of claim 12, wherein the power scaling controller is provided in the HEU.

16. The distributed communication system of claim 1, wherein the central unit comprises:
an electrical-to-optical (E/O) converter configured to convert the plurality of downlink digital communications signals into a plurality of downlink optical fiber-based communications signals, respectively; and
an optical-to-electrical (O/E) converter configured to convert a plurality of uplink optical fiber-based communications signals into the plurality of uplink digital communications signals, respectively.

17. The distributed communication system of claim 16, wherein the plurality of RAUs comprises:
a plurality of RAU O/E converters configured to convert the plurality of downlink optical fiber-based communications signals into the plurality of downlink digital communications signals, respectively; and
a plurality of RAU E/O converters configured to convert the plurality of uplink digital communications signals into the plurality of uplink optical fiber-based communications signals, respectively.

18. The distributed communication system of claim 16, wherein each of the plurality of channel circuits is configured to mathematically multiply magnitudes of digital samples representing a respective downlink digital signal among the plurality of downlink digital signals by a respective digital scaling factor to generate a respective scaled downlink digital signal among the plurality of scaled downlink digital signals.

19. The distributed communication system of claim 16, further comprising a power scaling controller communicatively coupled to the one or more RAUs, for each of the one or more RAUs, the power scaling controller is configured to:
determine the plurality of downlink channel bandwidths of the plurality of downlink digital signals;
determine the plurality of digital scaling factors based on the plurality of downlink channel bandwidths; and
provide the plurality of digital scaling factors to the plurality of channel circuits.

\* \* \* \* \*